P. M. HULBERT.
METHOD OF MANIPULATING PLASTIC GLASS AND APPARATUS FOR THE SAME.
APPLICATION FILED MAY 12, 1904.
1,118,204.
Patented Nov. 24, 1914.
2 SHEETS—SHEET 1.
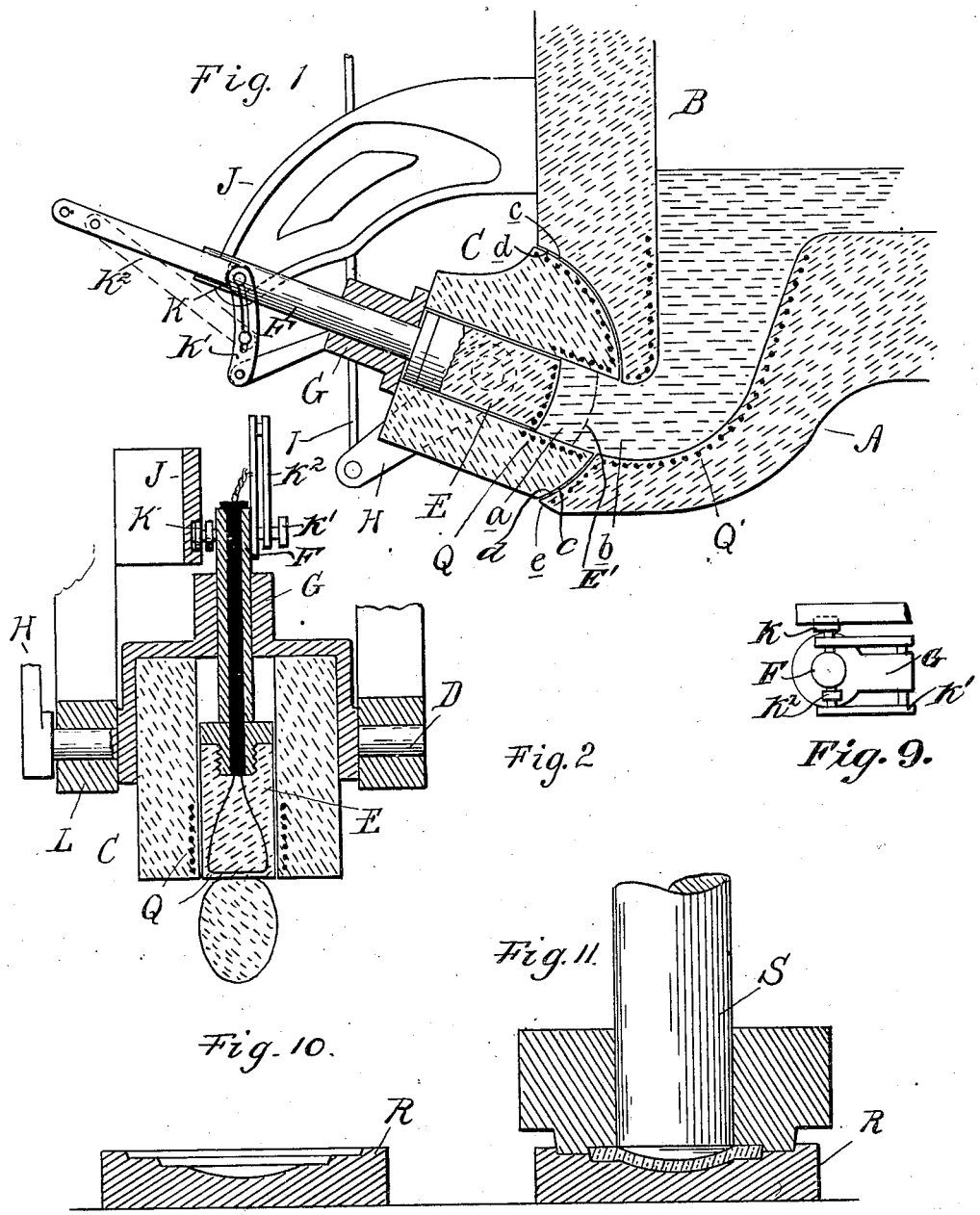

P. M. HULBERT.
METHOD OF MANIPULATING PLASTIC GLASS AND APPARATUS FOR THE SAME.
APPLICATION FILED MAY 12, 1904.
1,118,204.
Patented Nov. 24, 1914.
2 SHEETS—SHEET 2.
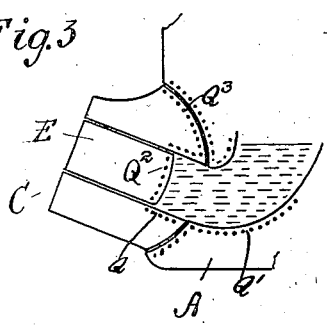
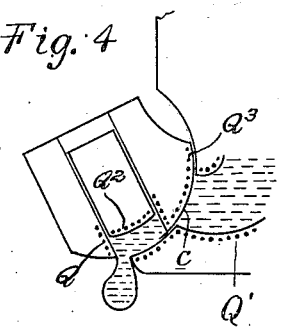
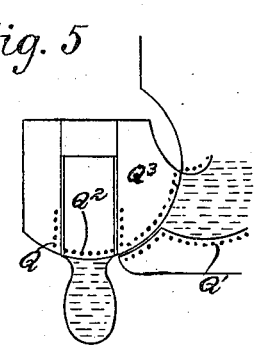
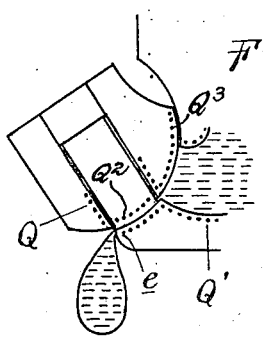
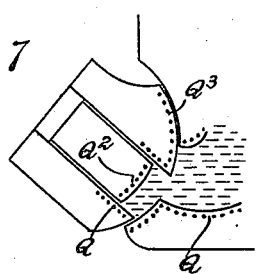
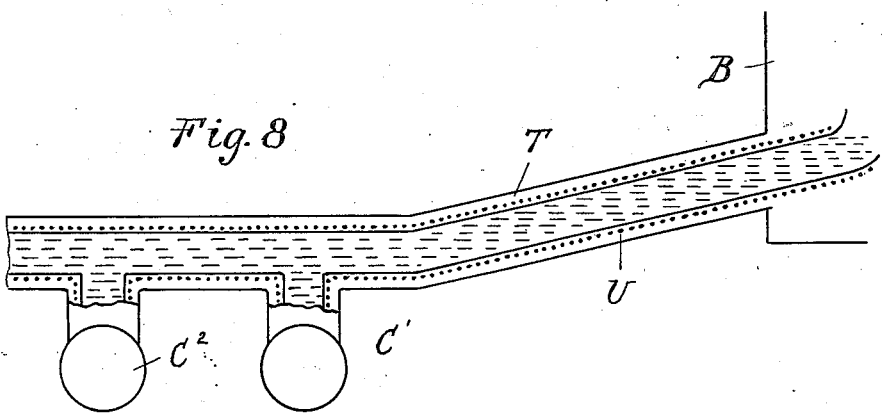
Witnesses:
H. C. Smith
A. L. Hobby
Inventor:
Prescott M. Hulbert

UNITED STATES PATENT OFFICE.

PRESCOTT M. HULBERT, OF DETROIT, MICHIGAN.

METHOD OF MANIPULATING PLASTIC GLASS AND APPARATUS FOR THE SAME.

1,118,204.  Specification of Letters Patent.  Patented Nov. 24, 1914.

Application filed May 12, 1904. Serial No. 207,673.

*To all whom it may concern:*

Be it known that I, PRESCOTT M. HULBERT, residing at Detroit, in the county of Wayne and State of Michigan, a citizen of the United States, have invented certain new and useful Improvements in the Method of Manipulating Plastic Glass and Apparatus for the Same, of which the following is a specification, reference being had therein to the accompanying drawings.

The invention relates to the manufacture of articles of glassware, and consists first in the method of manipulating the plastic glass prior to the fashioning of the same, and second, in the apparatus by which this manipulation is effected.

In the manufacture of articles of glass peculiar difficulties are experienced which are not common to other plastic arts. These difficulties are due to the inherent properties of the substance, among which is, first, that glass is only plastic when highly heated, and, second, in its molten or plastic condition it is extremely adhesive. As a consequence, any apparatus employed for manipulating the glass by actual contact therewith will either partially destroy its plasticity by chilling or will retain a certain portion of the glass with which it contacts. In the latter case, where the apparatus is subject to loss of heat through radiation, the amount of adhering glass will constantly increase so as to finally interfere with the performance of the function of the device.

With the present invention both difficulties are overcome by maintaining the surfaces of the apparatus for manipulating the glass which are in direct contact therewith at such a temperature as to avoid, first, the chilling of the glass under manipulation, and, second, the accumulation of a crust or deposit of partially hardened glass upon the surface.

My improved method may be carried out in various ways but in all the portions of glass manipulated are separated and transferred without chilling. Furthermore the portions separated may be accurately measured, so that successively separated portions are uniform in quantity.

In the drawings I have illustrated one form of apparatus which may be employed for separating pre-determined quantities of plastic glass from a mass thereof, and delivering the same to the fashioning device. It is obvious, however, that this specific form of apparatus may be varied without departing from the spirit of my invention.

As shown Figure 1 illustrates a longitudinal section through a measuring and transferring apparatus for molten glass. Fig. 2 is a front elevation thereof. Figs. 3, 4, 5, 6 and 7 are diagrams illustrating the operation of the device shown in Fig. 1; and Fig. 8 illustrates a modified form of apparatus in which the measuring and separating apparatus is arranged at a distance from the furnace in which the glass is melted, the plastic glass being automatically conveyed thereto. As has been stated the essential feature of my invention is that all surfaces contacting with the glass in measuring and transferring the same are maintained at a uniform high temperature, preferably substantially that of the plastic glass. This I preferably accomplish by electrically heating said surfaces so as to compensate the heat that would otherwise be lost through radiation. Fig. 9 is an end view showing the mechanism for adjusting the throw of the piston. Fig. 10 is a sectional view of one of the molds R, and Fig. 11 is a sectional view showing the mold with the presser plunger S in contact with the material.

As shown in Fig. 1, A is a conduit or discharge spout from a receptacle for a mass of molten glass, such as the furnace B, and C is a measuring and transferring device associated with said discharge spout. *a* is a pocket or receptacle in the transfer device C which is adapted to be registered with the discharge opening *b* of the spout A. The contacting surfaces *c* and *d* in the transfer device C and the spout A are of corresponding segmental form, and the member C is mounted upon trunnions D which permit of its being oscillated. The pocket *a* is also preferably adjustable in size and is further preferably provided with a mechanical ejector. The mechanism for this purpose as shown comprises a piston E slidable within the pocket. This piston is provided with an operating shank such as the piston rod F which is guided in bearings G secured to the member C, and the piston rod may be mechanically operated by suitable means such as the stationary cam J, with which engages a roller K on a rock lever K' connected by a link movement K² to the piston rod. The member C is rocked by suitable means, such as the crank arm H secured to one of the trunnions D and the reciprocatory rod I attached to said crank arm. Thus when the rod I is reciprocated the member C will be moved from a position shown in Figs. 1 and 3 successively to the positions illustrated in Figs. 4, 5, 6 and 7, and during this movement the cam J and roller K will cause a reciprocation of the piston E as will be hereinafter set forth. To change the movement of the piston a different cam may be substituted for the cam J, or by adjusting the link $K^2$ which will alter the size of the pocket as indicated by dotted line E'.

With the apparatus thus far described, molten or plastic glass flowing from the furnace through the discharge spout A will pass to the pocket $a$ in the member C, said pocket being opened to receive the glass by the outward movement of the piston E. As soon as the pocket is filled the trunnions D are rocked through the mechanism described, oscillating the member C so as to close the discharge aperture $b$ of the spout by the surface $c$ of the member C, and at the same time move the pocket beyond the segmental surface $d$ to permit of the discharge of the glass. The complete discharge is effected by a downward movement of the piston E, which ejects the glass in the pocket after which the trunnions D are again rocked to return the member C to its initial position, while at the same time the end $e$ of the surface $d$ will scrape over the surface $c$ to free the same of the greater portion of the adhering glass. When the piston E is once more in registration with the aperture $b$ it is again moved outward to free the pocket $a$ and fill the same with glass from the spout A.

The apparatus as above described would be inoperative for the continuous manipulation of glass, for the reasons heretofore stated, namely: First, that the walls or surfaces contact with the glass if cold would immediately chill the glass, and destroy its plasticity, and secondly, if initially heated but not constantly supplied with heat equal to that of the glass, the loss through radiation would soon cause the accumulation of a crust that would clog the apparatus and prevent operation. I have, therefore, arranged electric heaters Q, $Q^2$ and $Q^3$ which are preferably embedded in the walls of the pocket $a$, the end of the piston E and in the surface $c$ which cuts off or closes the aperture $b$. The lining of the spout A may, if necessary, be also provided with a heater Q'. These heaters may be formed by wires or strips embedded in the walls and maintained at incandescence by the passage of an electric current therethrough. The material of which the lining surfaces of the spout A and the member C are formed must, of course, be capable of withstanding a temperature equal to that of the plastic glass, and as the spout and transfer C are arranged without the furnace they are preferably provided with a suitable external heat insulation which prevents the rapid dissipation of the heat of the linings through radiation. When the heaters are in action the plastic glass may be continuously passed through the spout A and into the pocket $a$, and after each transfer the walls of said pocket will be cleared from all but an adhering film of glass, so that the apparatus will not become clogged.

The separating and transferring device above described will deliver the glass in its plastic, unchilled condition directly into the mold or other device in which the article is fashioned. In the drawings I have shown molds R which may be arranged in an endless series and which are successively moved to a position directly below the discharge of the pocket $a$ to receive the glass ejected therefrom. When the glass is deposited in the mold, the latter is moved into alinement with the pressing plunger S, which shapes the glass either in its final form or in the form of a blank suitable for further manipulation.

In Fig. 8 I have shown an arrangement in which a conduit T is arranged to lead from the glass tank in the furnace B to a series of measuring devices, C', $C^2$, &c., located at some distance from the furnace. The passage of the glass through the conduit T may be effected either by gravity or by any means of propulsion, and the clogging of the conduit is prevented by maintaining the lining thereof at a suitable temperature as by means of the heaters U. The measuring devices C', $C^2$, &c. may be similar in construction to the one already described.

The material employed forming the measuring receptacle and other parts of the apparatus, which contact with the molten glass, may be of any substance which will not have a detrimental action upon the glass. Thus, silicate of aluminum, or other clay, usually employed in the manufacture of glass pots, may be used. The specific construction of the heating resistance forms no part of the present invention, and any material known in the art capable of standing up under the temperature developed may be used.

What I claim as my invention is:—

1. The method of manipulating glass which consists in mechanically separating from a body of heated plastic glass an accurately measured and completely severed unchilled portion corresponding in quantity to a single article to be fashioned therefrom.

2. The method of manipulating plastic glass which consists in separating and delivering to the fashioning means a measured quantity of heated glass by instrumentalities maintained at a temperature as high as that at which glass is plastic.

3. The method of manipulating glass, which consists in mechanically separating from a mass of heated plastic glass an accurately measured unchilled portion corresponding to the capacity of a mold, and in dropping the separated portion from a surface heated to a temperature at which glass is fluid directly into the mold.

4. The method of manipulating glass, which consists in filling a measuring receptacle with heated plastic glass and in then ejecting the glass from said receptacle, the surfaces with which the glass contacts being maintained at a temperature above the melting point of the glass.

5. The method of manipulating glass which consists in filling with plastic glass a measuring receptacle, the contacting surfaces of which are heated to a temperature above the melting point of the glass, and in discharging the glass from said receptacle without intermediate contact with the other surfaces directly to the fashioning means.

6. The method of manipulating glass, which consists in filling with plastic glass a measuring receptacle, the contacting surfaces of which are heated to a temperature above the melting point of the glass, in separating the glass in said receptacle from the mass by the interposition of a cut-off heated to an equally high temperature, and in discharging the glass from said receptacle directly and without intermediate contact with the other surfaces to the fashioning means.

7. An apparatus for manipulating glass comprising a measuring receptacle, means for alternately filling with and discharging from said receptacle plastic glass and means for maintaining the surfaces of said receptacle contacting with the glass at a temperature as high as that at which glass is plastic.

8. An apparatus for manipulating glass comprising a measuring receptacle, means for alternately filling with and discharging from said receptacle plastic glass, a cut-off for serving the measured glass in said receptacle from the source of supply, and means for maintaining the contacting surfaces of said receptacle and cut-off at a temperature as high as that at which glass is plastic.

9. An apparatus for separating measured quantities of plastic glass comprising a measuring receptacle, means for placing said receptacle in communication with a mass of plastic glass to fill the same, a cut-off for severing the glass in said receptacle from the mass, and completely closing said receptacle, the surfaces of said receptacle and cut-off in contact with the glass being maintained at a temperature as high as that at which glass is plastic, and means for positively discharging the glass from said receptacle.

10. An apparatus for separating measured quantities of plastic glass comprising a cylinder, a piston therein, means for moving said cylinder into and out of communication with a mass of plastic glass, means for moving said piston while said cylinder is in communication with the glass to fill therein a predetermined quantity and for oppositely moving said piston when out of communication with the mass of glass to discharge the measured quantity, and means for maintaining the surfaces of said cylinder and piston in contact with the glass at a temperature as high as that at which glass is plastic.

11. The method of manipulating glass, which consists in separating from a mass of plastic glass a portion thereof by the interposition of a highly heated medium.

12. The method of manipulating glass, which consists in severing from a mass of plastic glass a portion thereof by the interposition of a cut-off heated to a temperature at which the plastic glass will freely separate therefrom.

13. The method of manipulating glass, which consists in severing from a mass of plastic glass a portion thereof by the interposition of a cut-off heated to a temperature as high as that of the glass.

14. The method of manipulating glass, which consists in filling a measuring receptacle with plastic glass and interposing a cut-off between said receptacle and the mass of glass, said receptacle and cut-off being heated to a temperature as high as that at which the glass will freely separate therefrom.

15. The method of manipulating glass, which consists in separating from a mass of plastic glass, an unshaped measured quantity by the interposition of a highly heated cut-off.

In testimony whereof I affix my signature in presence of two witnesses.

PRESCOTT M. HULBERT.

Witnesses:
H. C. SMITH,
JAS. P. BARRY.